(12) United States Patent
Kular et al.

(10) Patent No.: US 8,264,193 B2
(45) Date of Patent: Sep. 11, 2012

(54) PHOTOVOLTAIC POWER OUTPUT-UTILIZING DEVICE

(76) Inventors: Andrew C. Kular, Ottawa (CA); Zuohang Zhu, Ottawa (CA)

( * ) Notice: Subject to any disclaimer, the term of this patent is extended or adjusted under 35 U.S.C. 154(b) by 142 days.

(21) Appl. No.: 11/996,157

(22) PCT Filed: Jul. 20, 2005

(86) PCT No.: PCT/IB2005/003343
§ 371 (c)(1),
(2), (4) Date: Jan. 18, 2008

(87) PCT Pub. No.: WO2007/010326
PCT Pub. Date: Jan. 25, 2007

(65) Prior Publication Data
US 2008/0224652 A1    Sep. 18, 2008

(51) Int. Cl.
*H02J 7/00*    (2006.01)
(52) U.S. Cl. .................................... 320/101; 320/167

(58) Field of Classification Search .................. 320/101, 320/102, 166, 167
See application file for complete search history.

(56) References Cited

U.S. PATENT DOCUMENTS

| | | | |
|---|---|---|---|
| 6,590,370 B1 * | 7/2003 | Leach | 323/299 |
| 6,919,714 B2 * | 7/2005 | Delepaut | 323/284 |
| 7,190,133 B2 * | 3/2007 | King et al. | 318/375 |
| 7,436,148 B2 * | 10/2008 | Saeki et al. | 320/104 |
| 7,545,117 B2 * | 6/2009 | Kular et al. | 320/103 |
| 2004/0124816 A1 | 7/2004 | DeLepaut | |
| 2006/0133003 A1 * | 6/2006 | Kular et al. | 361/100 |

FOREIGN PATENT DOCUMENTS

EP    0685924 A2    6/1995

* cited by examiner

*Primary Examiner* — Ramy Ramadan
(74) *Attorney, Agent, or Firm* — Timothy D. Bennett; Emerson Thomson Bennett

(57) ABSTRACT

Briefly described, the invention provides a photovoltaic assembly power output utilizing device which partially charges a capacitor assembly. This capacitor assembly is then partially discharged by a DC/DC power converter in different ranges of voltages in which the power output from the photovoltaic assembly peaks for different light intensities.

18 Claims, 6 Drawing Sheets

PHOTOVOLTAIC POWER OUTPUT-UTILIZING DEVICE

CROSS REFERENCE TO RELATED APPLICATIONS

This application claims the priority of PCT/IB2005/003343 filed on Jul. 20, 2005, the entire contents of which are hereby incorporated in total by reference.

FIELD OF THE INVENTION

The present invention relates to a photovoltaic power output-utilizing device.

BACKGROUND OF THE INVENTION

In, for example, U.S. Pat. No. 3,921,049, issued to G. Mellors et al. on Nov. 18, 1975, a photovoltaic assembly for charging a battery is described. The photovoltaic assembly is simply connected to the battery to be charged with a diode between them. This diode prevents reverse current flow when the photovoltaic assembly is not subjected to sufficient light intensity for the photovoltaic assembly output voltage to be greater than the battery voltage plus the diode forward voltage.

While the device of G Mellors et al. is useful, any light intensity to which the photovoltaic assembly is subjected, which can not generate a voltage greater than the combined voltage of the battery and the diode, will not activate the photovoltaic assembly to output a charge current. As a result, power outputs at these light intensities are not utilized. This situation worsens as the battery voltage increases as it is being charged.

There is a need for a photovoltaic assembly power output-utilizing device which utilizes, more effectively, available light. In particular, a photovoltaic assembly is desired which outputs over a wide range of light intensity to which the photovoltaic assembly is subjected.

In U.S. Pat. No. 6,367,259, issued to M. Timm on Apr. 9, 2002, it has also been proposed to accumulate electrical energy from a photovoltaic assembly through a capacitor and a control circuit, and then directly discharge the capacitor to, for example, an electric motor once there is enough energy accumulated in the capacitor to run the electric motor.

While the device described in the Timm patent is useful, the range of the voltages in which the capacitor is discharged determines the power output from the photovoltaic assembly, and the operating voltage range of the electric motor determines this range.

This range of voltages will not provide the greatest power output that the photovoltaic assembly is capable of providing.

There is a need for a photovoltaic power output-utilizing device, which will obtain the greatest possible output of energy from the photovoltaic assembly in at least one output voltage range.

SUMMARY OF THE INVENTION

Briefly described, the invention provides a photovoltaic assembly power output utilizing device which partially charges a capacitor assembly. This capacitor assembly is then partially discharged by a DC/DC power converter in different ranges of voltages in which the power output from the photovoltaic assembly peaks for different light intensities.

In one embodiment, the present invention is a photovoltaic power output-utilizing device, comprising:

a) a partially dischargeable, input voltage adjustable capacitor assembly connecting to the photovoltaic assembly in parallel for accumulating electrical energy from the photovoltaic assembly, and b) an electronic control circuit for charging the capacitor assembly by the photovoltaic assembly, and then partially discharging the capacitor assembly, in a photovoltaic assembly output voltage range in which peak power output there from occurs.

In this embodiment, said voltage range may be one of a plurality of voltage ranges, and the control circuit may include both a means for monitoring the current and voltage outputs from the photovoltaic assembly, and a means for changing the voltage range in which the capacitor assembly is charged and partially discharged to obtain peak power from the photovoltaic assembly.

In an additional embodiment of the invention, a capacitor assembly output DC/DC power converter may be provided. The DC/DC power converter is used for converting at least some of the capacitor discharge voltage to a desired level. In a further embodiment of the invention, the DC/DC power converter is used for converting at least some of the capacitor discharge current to a desired level.

In yet another embodiment of the invention, the device may be for charging an electrical energy storage device. In this embodiment, the DC/DC power converter is capable of increasing capacitor assembly output discharge voltages to a storage device charge voltage, and the device would comprise a direct discharge path to the energy storage device. In particular, the device would comprise a means for charging the energy storage device through the DC/DC power converter when the capacitor assembly discharge voltage needs to be increased, and a means for charging the energy storage device directly by a direct charging path when the capacitor assembly discharge voltage is not less than the charging voltage.

These and other features of the invention will be more fully understood by references to the following drawings.

DETAILED DESCRIPTION

Figure 1:
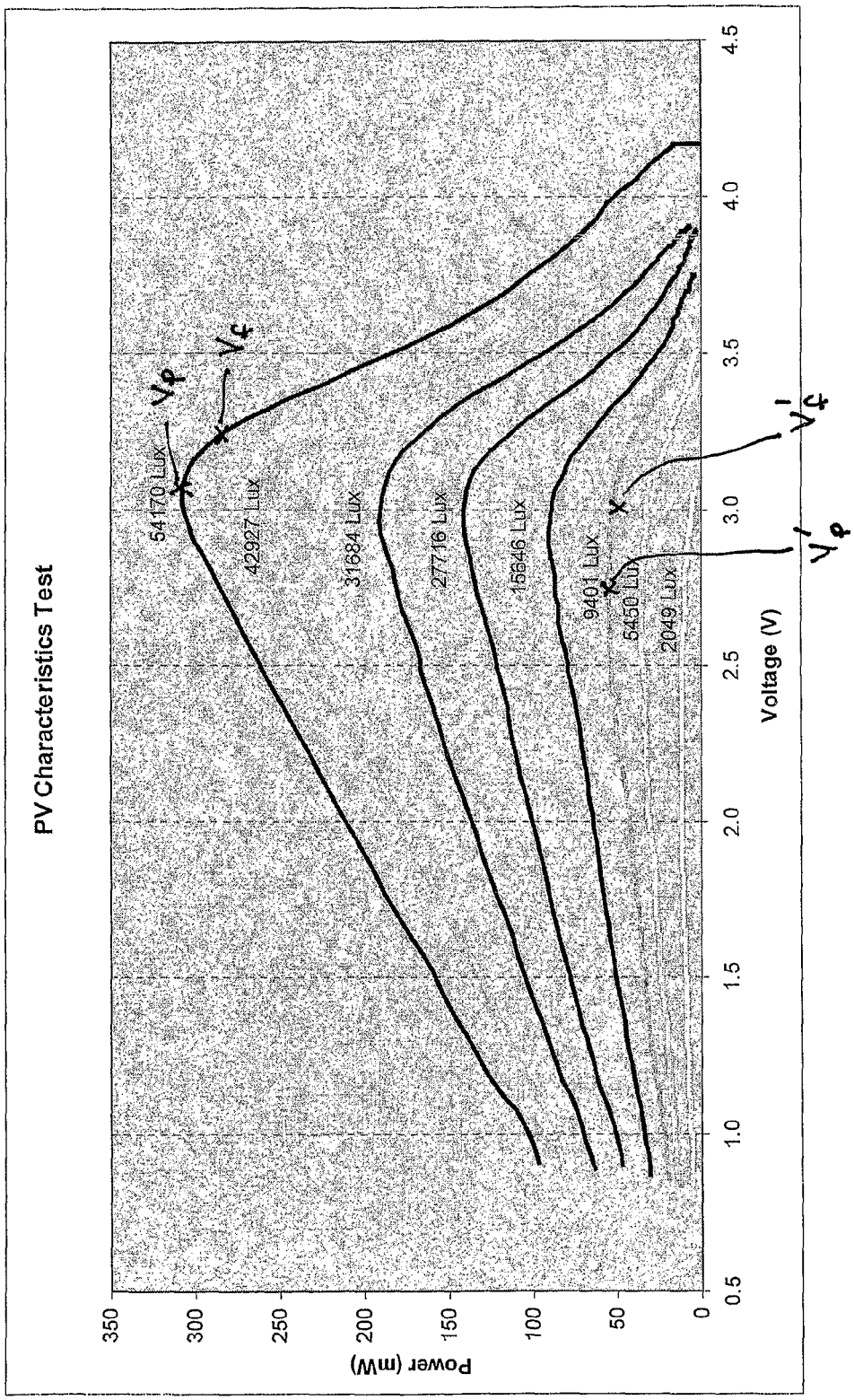
FIG. 1 is a graph of the result of tests showing the power outputs from a photovoltaic assembly at different light intensities to which the assembly was subjected, plotted against the output voltage.

The present invention relates to optimizing the performance of a photovoltaic (PV) assembly with respect to the light intensity it receives. In developing this invention, Applicants performed tests to measure how the power output of a typical photovoltaic assembly was affected by the light intensity. These tests were conducted by Applicants using a photovoltaic assembly in the form of a PV panel with eight cells in series connection. The results of these tests are shown in FIG. 1 where the PV panel power outputs ("Power (mW)") for different light intensities on the PV panel are plotted against the PV panel output voltage ("Voltage (V)").

The graph illustrates that when the light intensity remains substantially unchanged, the power (mW) increases with the output voltage (V) also increasing until the Power (mW) peaks; from where the voltage (V) will continue to increase while the power (mW) declines. Utilizing this phenomenon, Applicants have arrived at the present invention where for a constant light intensity on the PV panel, improved power is obtained from the PV assembly. In particular, the present invention determines once peak power has been attained, it then commences partially discharging the capacitor. This discharge operation terminates once the voltage drops to a finishing voltage $V_f$ level. By way of example, this finishing voltage $V_f$ may be 90% of the voltage peak ($V_p$).

Further analysis of the test results indicated that, for maximum utilization of the output power from the photovoltaic assembly, for different light intensities, the voltage peak ($V_p$) and post-peak, finishing voltage ($V_f$) are different. This is particularly apparent when the light intensities on the PV panel are small and the maximum power occurs at a voltage of less magnitude when compared with the results obtained at greater light intensities.

Figure 2:
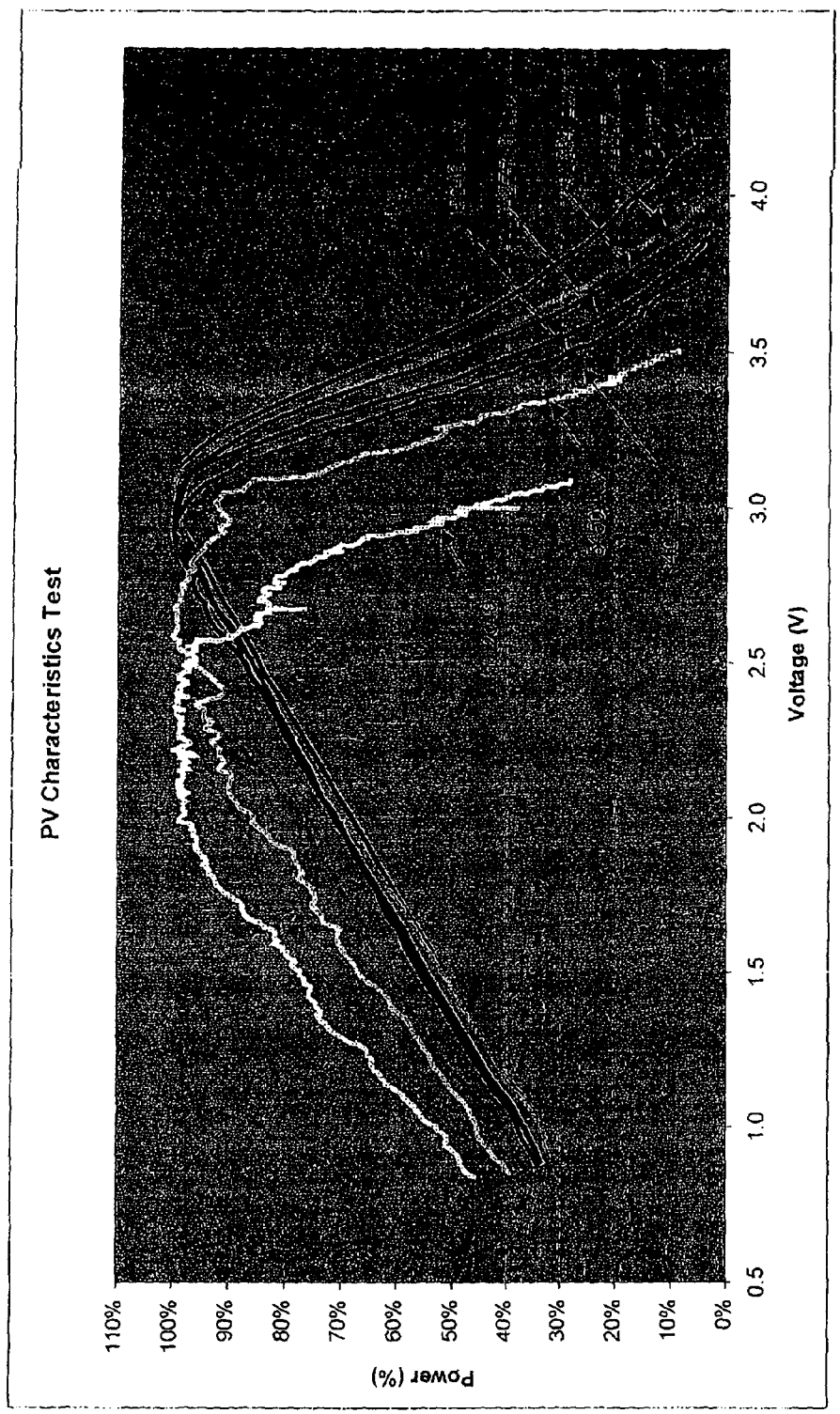
FIG. 2 is a similar graph to FIG. 1, but showing the power outputs from the photovoltaic assembly in terms of percentage of their maximum output power dependent on the output voltage.

FIG. 2 is a graph which depicts, for the different light intensities, output power ("mW") as a percentage power ("%") of the maximum power available at that light intensity for the voltage ("V").

In a situation in which the power is to be used to charge a battery, and assuming the battery voltage is about 3 volt, FIG. 2 indicates that about 90-100% power of the maximum power can be charged to the battery when the light intensity is greater than about 20,000 Lux. However, if the light intensity is less than about 20,000 Lux, the percentage power charged to the battery is much less. For example, for a light intensity of 2,000 Lux the percentage power charged to the battery is only about 40-50%. If the light intensity is even less, then the maximum voltage the PV panel can generate may be even lower than the battery voltage. Under these light intensities the PV panel will not be able to charge the battery, and so the charging efficiency then is zero. However, and as further depicted in FIG. 2, if the battery voltage is as small as 2 volt, the charging efficiency will be excellent for low light intensities—but, will only be 60-80% for the greater light intensities.

From an analysis of FIG. 2 it can be seen that when conventional charge circuits are used to, for example, charge a battery, the charge circuit can only deliver a part of the electrical energy generated by the PV panel. The charge efficiency is affected greatly by both the light intensity level and the battery voltage level. Thus, the charge efficiency of a conventional circuit is not only low, but ceases to deliver any electrical energy when the maximum PV voltage is less than the battery voltage. While charging a battery has been used as an example, these restrictions on the electrical energy that is utilized from a PV panel, using a conventional circuit also apply where the electrical energy is to be used for other purposes, such as, for example, heating or refrigeration.

The above analysis led applicant to arrive at the present invention wherein a photovoltaic assembly power output utilizing device is provided which will access a larger percentage of the electrical energy capable of being emitted from the photovoltaic assembly over a wide range of light intensities than was previously possible.

Figure 3:
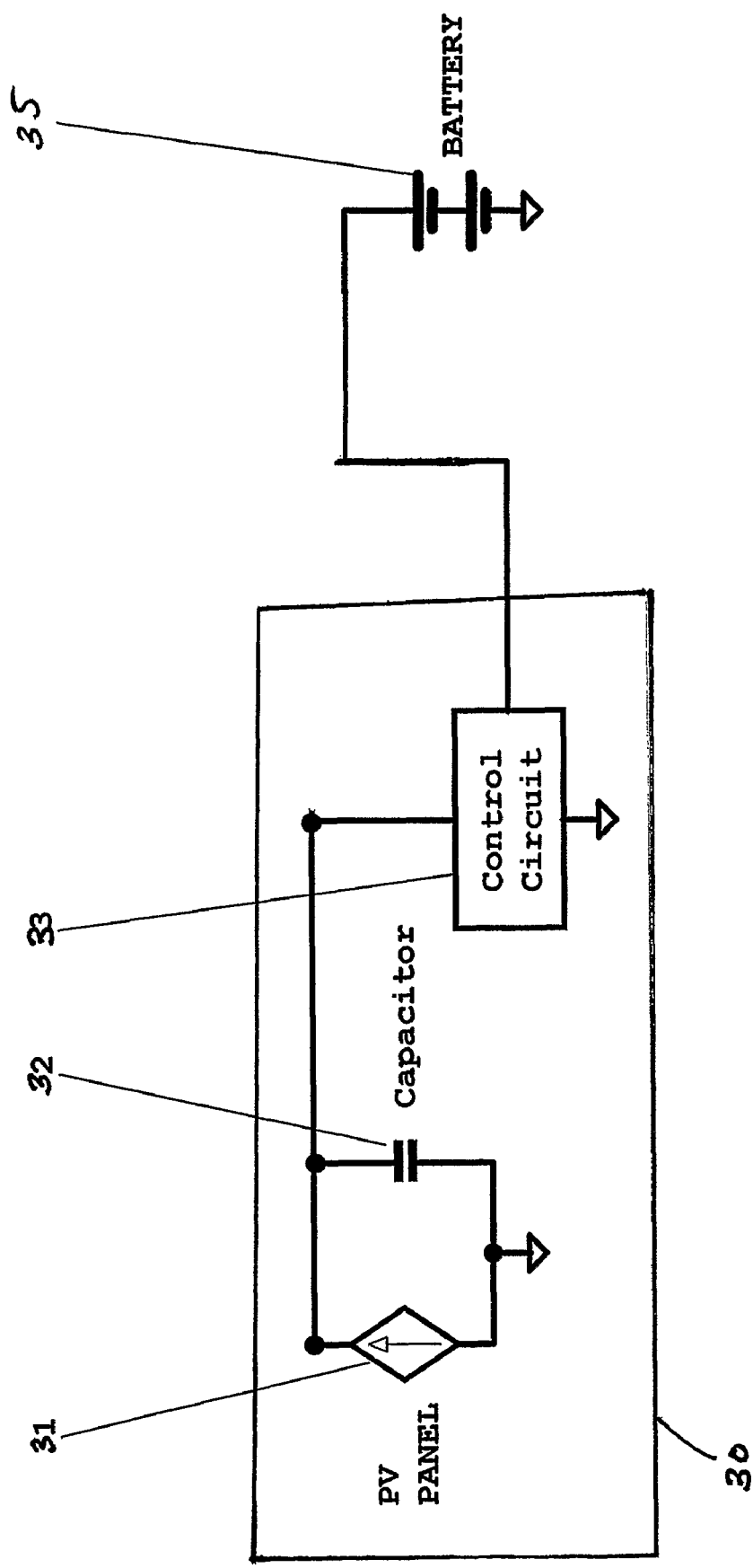
FIG. 3 is a circuit diagram of a photovoltaic assembly for charging a battery through a photovoltaic assembly power output-utilizing device according to one embodiment of the invention.

From the above test results and analysis, the applicant has provided the embodiment of the invention depicted in FIG. 3. FIG. 3 illustrates a photovoltaic assembly power output-utilizing device 30 whose output is supplied to a battery 35. Device 30 comprises a partially dischargeable, input voltage adjustable, capacitor assembly 32. It further comprises an electronic control circuit 33 for charging the capacitor assembly 32, by a photovoltaic assembly 31. This arrangement permits a partial discharge of the capacitor assembly 32, in a photovoltaic assembly output voltage range where at least one peak power output there from occurs, Using the embodiment of the invention depicted in FIG. 3, similar tests to those described with reference to FIGS. 1 and 2 are carried out for the photovoltaic assembly 31. From these tests a capacitor assembly 32 charging and discharging voltage range is determined wherein the peak power outputs are obtained for a range of light intensities to which the photovoltaic assembly 31 is exposed. Using the data of FIG. 1 as an example, this voltage range could be about 2.6 to 3.2 volts.

The control circuit 33 is then constructed (using only hardware devices) or programmed (using a combination of hardware and software) to charge and discharge the capacitor assembly 32 in this voltage range thereby obtaining the maximum output power from the photovoltaic assembly for a particular range of light intensities thereon.

Figure 4:
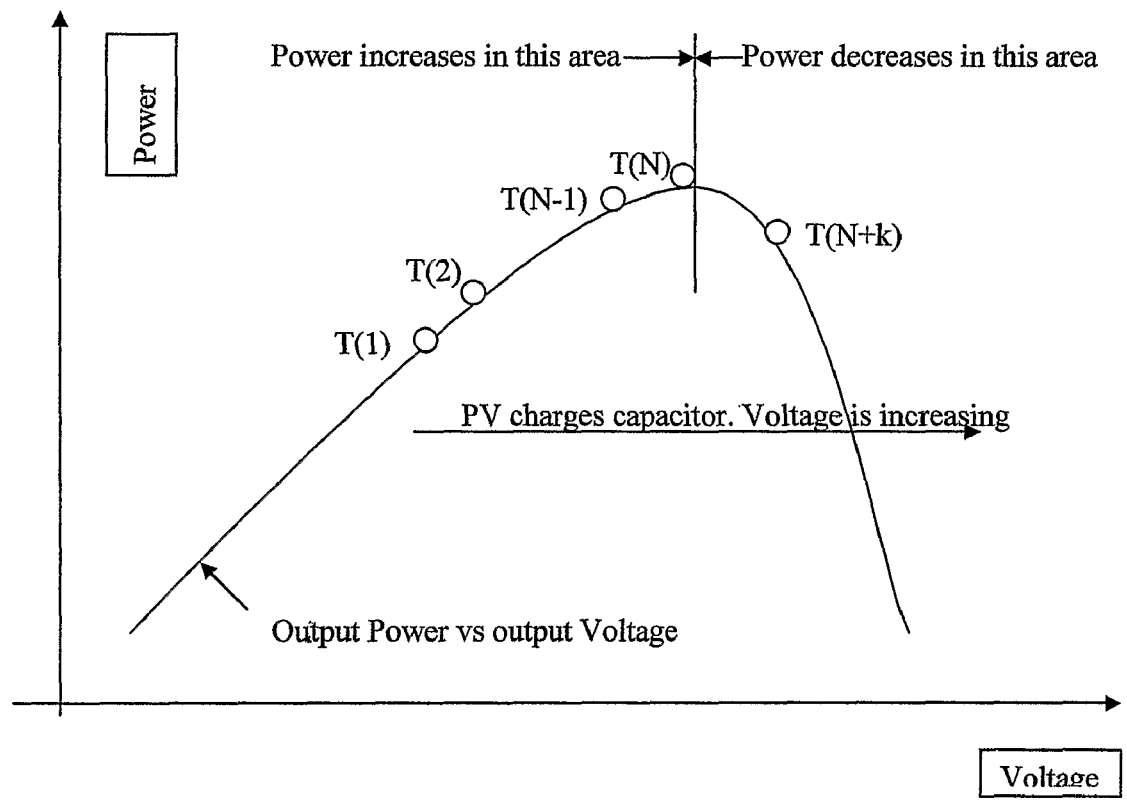
FIG. 4 is a graph showing the power output from a photovoltaic assembly plotted against the output voltage as charging of a capacitor occurs in an embodiment of the invention.

FIG. 4 is a graph showing the power output from photovoltaic assembly 31 plotted against the output voltage as charging capacitor assembly 32 occurs. As illustrated in FIG. 4, when the PV panel charges the capacitor assembly, the voltage increases. Assuming the starting time point is T(1). The invention determines that at successive samples T(1) and T(2), the power is increasing. The invention continues sampling and subsequently finds that at time point T(N+1), the power starts falling. According to one embodiment of the invention, when the power falls to a percentage of the power at the point T(N) (e.g., 97%) at time point T(N+k), the invention then starts to discharge the capacitor assembly and the voltage starts to decrease. That is, both the voltage of the capacitor assembly 32 and the photovoltaic assembly 31 decrease, as these components are connected in parallel.

Figure 5:
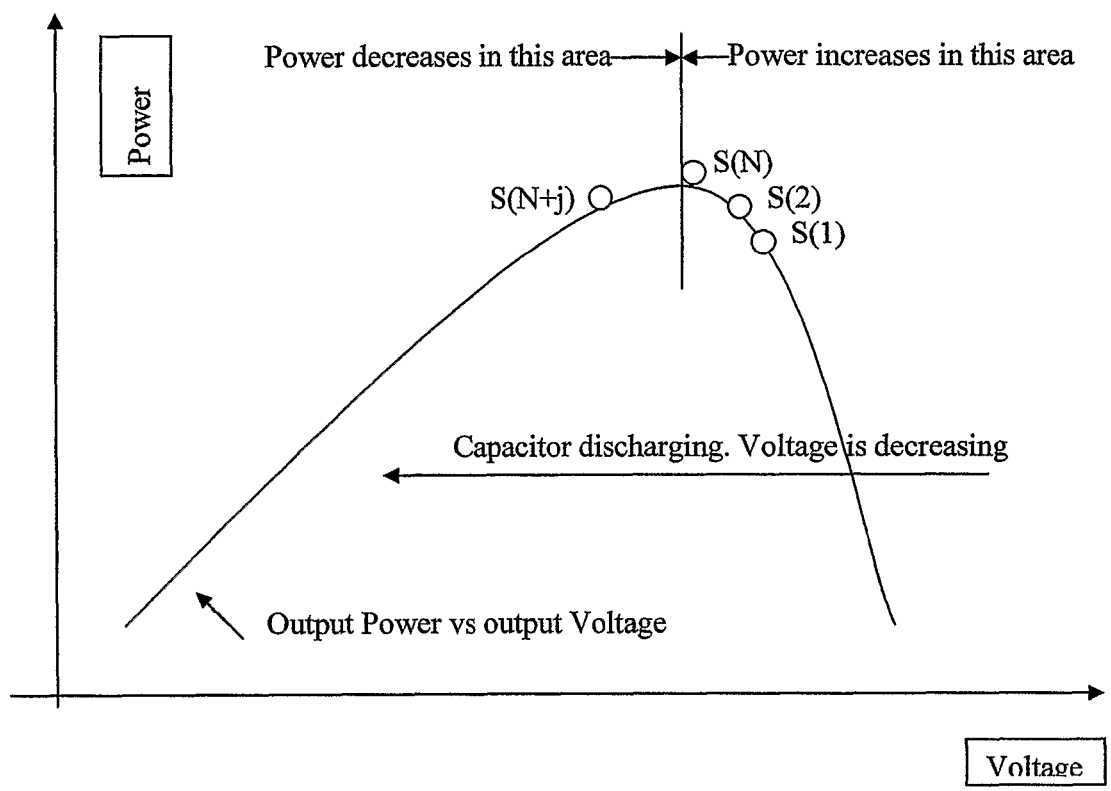
FIG. 5 is a graph showing the power output from a photovoltaic assembly plotted against the output voltage as discharging of a capacitor occurs in an embodiment of the invention; and, FIG. 6 is a circuit diagram of an additional embodiment of the invention in which a DC/DC power converter is utilized.

FIG. 5 is a graph showing the power output from photovoltaic assembly 31 plotted against the output voltage as discharging capacitor assembly 32 occurs. When the capacitor assembly is in discharge, the voltage decreases. As illustrated in FIG. 5, the invention starts sampling from time point S(1). During the time period from S(1) to S(N), the output power is increasing. After time point S(N), the output power starts decreasing. When at the time point S(N+j) the output power falls to a threshold percentage of the power at time point S(N) (e.g., 97%), the invention then stops discharging the capacitor assembly. The voltage then will start to increase again and the next charge and discharge cycle commences.

From this it will be seen that even with this basic embodiment of the present invention, the output voltage from the photovoltaic assembly 31 is maintained in a voltage range where the power output from the photovoltaic assembly is greatest for a particular range of light intensities thereon. Thus a photovoltaic assembly power output-utilizing device 30 is provided which utilizes more of the power output from the photovoltaic assembly than is possible with other, known devices.

It will be seen that in the embodiment described above, the control circuit 33 charges and discharges the capacitor assembly 32 at a fixed charging and discharging voltage. These charging and discharging voltages are chosen to obtain the greatest power output for a limited range of light intensities on the photovoltaic assembly 31.

However, it will be seen from FIGS. 1 and 2 that the photovoltaic assembly output voltage, for peak power output, shifts for different light intensities on the photovoltaic assembly. In a more complex embodiment of the present invention, which will now be described, this voltage shift is taken account. This embodiment is particularly useful where, for example, the most power output from the photovoltaic assembly is desired, particularly at low light intensities thereon.

Figure 6:
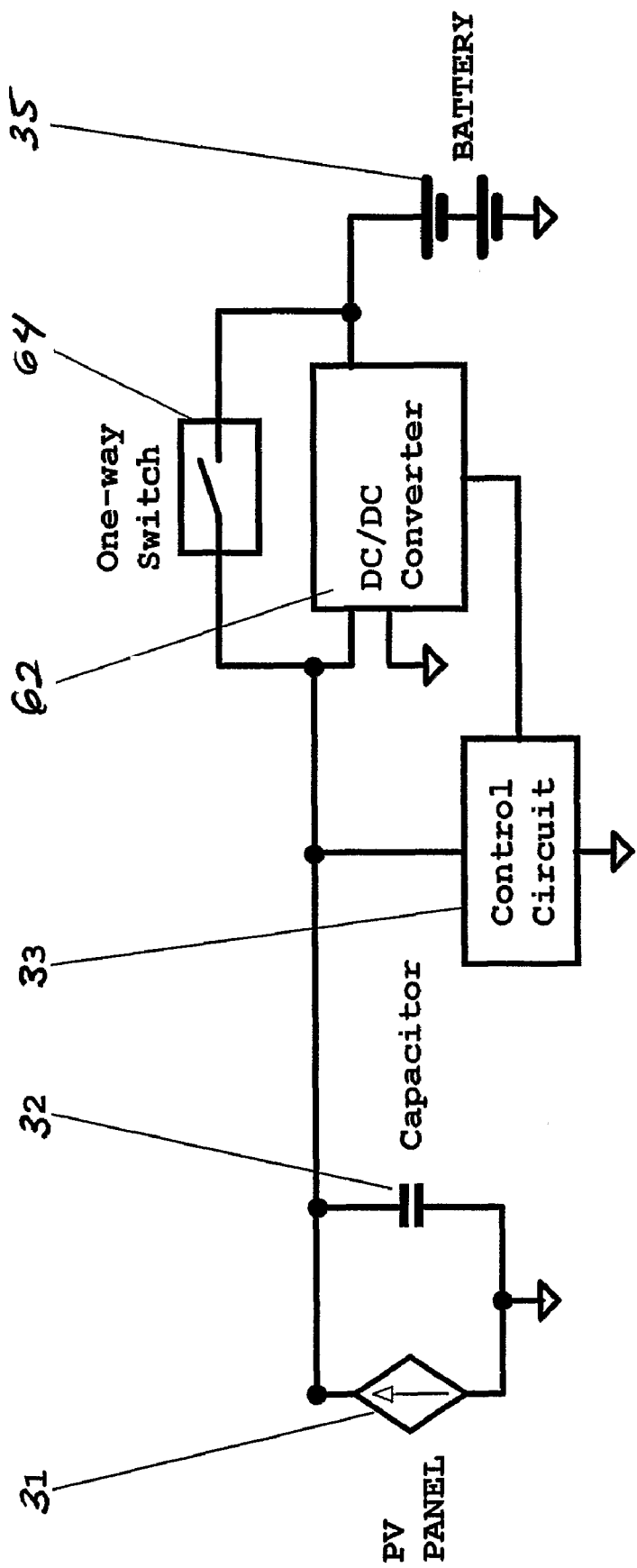

FIG. 6 illustrates this further embodiment of the invention which addresses the situation in which the charge and discharge voltage range is one of a plurality of voltage ranges, each of which is for a particular light intensity on the photovoltaic assembly 31. The control circuit 33 includes means for monitoring the current and voltage outputs from the photovoltaic assembly, and means for changing the voltage range in which the capacitor assembly 32 is charged and partially discharged to obtain peak power from the photovoltaic assembly.

In this embodiment, the capacitor assembly 32 is a super-capacitor assembly although alternative embodiments of the present invention may utilizes various electrical devices, which are partially dischargeable and input voltage adjustable. The embodiment shown in FIG. 6 is useful for charging an energy storage device, such as, for example, a battery. In FIG. 6 a DC/DC power converter 62 is provided, and the device is shown for charging a battery 35.

In operation, the capacitor assembly 32 and the control circuit 33 operate as described above to receive peak output power from the photovoltaic assembly in different voltage ranges depending on the light intensity on the photovoltaic assembly 31. When the light intensity on the photovoltaic assembly 31 produces a voltage discharge from the capacitor assembly 32 that is less than that needed to charge the battery 35, the control circuit 32 uses the DC/DC power converter 62 to convert the discharge voltage to a voltage that will charge the voltage.

When the light intensity on the photovoltaic assembly 31 produces a voltage discharge from the capacitor assembly 32 that will charge the battery 35, the control circuit utilizes switch 64 to bypass the DC/DC converter 62 and thereby directly charge the battery 35.

In other embodiments of the present invention, the DC/DC power converter 62 converts the discharge from the capacitor assembly 32 to a desired current level.

In further embodiments of the invention, the control circuit 32 may contain:
  a) a programmed electronic control circuit,
  b) a circuit containing firmware composed of instructional sets and algorithms,
  c) a field programmable gate array,
  d) a microcontroller, or
  e) an application-specific integrated circuit.

In still further embodiment of the invention the DC/DC power converter 62 may contain:
  a) a switching-mode DC/DC converter,
  b) a one-way ON/OFF direct charge switch (thereby forgoing the separate, one-way switch 64 depicted in FIG. 6),
  c) a step-up DC/DC converter,
  d) a step-down DC/DC converter,
  e) a buck-boost DC/DC converter,
  f) a constant output voltage DC/DC converter, or
  g) a constant output current DC/DC converter.

In a specific embodiment of the invention, a photovoltaic assembly power output-utilizing device was designed and implemented for a photovoltaic assembly in the form of a small (8 cm×5 cm) PV panel which has eight cells connected in series. This device comprised:

a) A 300 mF, 4.5V super-capacitor for receiving energy from the PV panel and adjusting the output voltage of the PV panel through charging and discharging the super-capacitor.

b) A DC/DC power converter between the super-capacitor and the battery to discharge the super-capacitor to the battery. The DC/DC converter had 90-95% power conversion efficiency with constant current output no matter if the battery voltage is high or low. The voltage range of the rechargeable battery was from 0.8-4.5 volt. In parallel to the DC/DC converter, there was a direct charge path from the super-capacitor to the battery. When it was the time to discharge the super-capacitor to the battery, the control circuit activates the direct charge switch to drain the energy directly from the super-capacitor to the battery. This direct charge had up to 98-99% charging efficiency. If the voltage of the super-capacitor is less than the battery voltage, the control circuit will activate the DC/DC converter to discharge the super-capacitor to the battery.

c) The control circuit contained a microcontroller and peripherals. The microcontroller has a built-in 10-bit analog to digital converter (ADC) for measuring output voltage and electrical current from the PV panel. The analog signal representing the output voltage of the PV panel was attenuated and buffered before input to ADC of the microcontroller. The analog signal representing the output current from the PV panel was obtained by using a current sensing resistor and an amplifier. The output current from PV panel generated a small voltage drop on the sensing resistor. The small voltage drop then was amplified to a useable voltage level and was fed to the ADC. This analog signal was proportional to the electrical current form the PV panel. The ADC digitized these two analog signals and then the microcontroller used the two digitized value for calculating the output power from the PV panel.

d) This embodiment of the invention used two alternative methods of calculating output power from the PV panel, each method implemented in firmware.

The first one is based on the fact that the power is the product of voltage times current:

$$Power(W)=Voltage(V)*Current(A).$$

Another method is to calculate the average output power from the PV panel to the super-capacitor by measuring voltage change in a short period of time. This method is based on the fact that the energy (E) stored in the super-capacitor is proportional to the terminal voltage (V) of the super-capacitor. The energy equation is:

$$E=\tfrac{1}{2}*C*V^2,$$

where C is the capacitance of the super-capacitor.

If in the period of time $\Delta T$ from T1 to T2, the voltage changes from V1 to V2, then the energy change ($\Delta E$) in the super-capacitor will be:

$$\Delta E=\tfrac{1}{2}*C*(V2+V1)*(V2-V1)$$

Therefore the average power (P) from the PV panel to the super-capacitor in the period of time $\Delta T$ is:

$$P=\Delta E/\Delta T=\tfrac{1}{2}*C*(V2+V1)*(V2-V1)/\Delta T$$

Based on this equation, an average electrical current from the PV panel during the period of time ΔT can be derived as follows:

$$I = P/V = C * \Delta V / \Delta T$$

The ΔT value can be achieved precisely with a timer in the microcontroller.

These two methods are the same theoretically. It will depend on the application situation to choose which one to use.

e) An algorithm for searching the occurrence of a peak power output from the PV panel. As is shown in FIG. 1, the PV panel always has a power output peak or climax of output power no matter what light intensity it is subjected to. The present invention determines when that peak power output has occurred. In particular, the firmware running in the microcontroller reads the output voltage and electrical current from the PV panel, in time intervals of ΔT and calculates the output power P(i). It then compares this P(i) value with the previous output power value P(i−1). If P(i) is greater than P(i−1), then that the output power from PV panel is increasing and approaching the climax. At this time, the firmware will let the PV panel continue charging the super-capacitor while the output voltage from the PV panel is increasing. At some point in time, the current output power P(c+1) will be less than the previous value P(c). When the firmware so determines that the output power has reached and is now past the climax, the firmware will turn ON the DC/DC power converter to discharge the super-capacitor until the firmware finds that the output power and output voltage are decreasing at same time. In alternative embodiments of the invention this decision to stop discharging the capacitor is based on the current output power dropping below a threshold determined as a percentage (e.g. 90%) of the previously determined maximum P(c) value. In this manner, the searching algorithm for the maximum output power for the PV panel turns ON/OFF the DC/DC power converter to intermittent discharge the super-capacitor periodically so that the PV panel can output its maximum power, even in the situation when the light intensity changes.

f) A firmware running in the microcontroller to perform the functions described in item e) above:
  i) Measure the output voltage and electrical current from the PV panel, and to calculate the output power from the PV panel,
  ii) Search the peak output power point, and
  iii) Turn ON/OFF the DC/DC power converter to discharge the super-capacitor.

In addition, this firmware implements a further embodiment of the invention related to searching the peak output power point (item ii immediately above), wherein the time constant ΔT is changed if the light intensity changes. In particular, to improve the efficiency of the system, ΔT is adjusted so that too large a change in PV output voltage does not normally occur in a ΔT period. To that end, a constant ΔVc is stored in the memory of the microcontroller. This ΔVc is the maximum voltage difference allowed for the PV output voltage to be greater or less than the voltage (e.g., P(c)) occurring at a power peak. If the firmware determines that the current from the PV panel is changing, it will recalculate the ΔT for the new light intensity based on the following equation:

$$\Delta T = (C/I) * \Delta Vc$$

As a result, the time intervals of ΔT for lower light intensity are longer than those for higher light intensities. In particular, and for various examples of the invention, this ΔT may have a range of 0.1 ms to 16 seconds.

In addition to functions described above, this firmware also performs the following functions:
  iv) Measure battery voltage, and
  v) Control the microcontroller in such a way that the microcontroller works in "Burst" mode. The microcontroller and the firmware sleep most of time and only wake up for 3 to 5 milliseconds to do routine checks and controls. The wake-up time interval depends on the light intensity level and occurs more frequently for greater light intensity than for low light intensity. In one embodiment the microcontroller's working time is less than 0.5% if the wake-up time interval is more than, for example, one second. The average power consumption for the microcontroller is less than 5 uW. To further reduce system power consumption, all peripherals can be shot down when the microcontroller does not need them. Due to the extreme low power consumption, this control system is suitable not only for the large PV panel, but also for very small PV panel.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A photovoltaic assembly power output utilizing device, comprising:
  a photovoltaic assembly having a power output, said power output having at least one peak power output value;
  a super-capacitor assembly, having an adjustable input voltage and capable of being partially dischargeable and an output DC/DC converter; and,
  an electronic control circuit for charging the super-capacitor assembly by the photovoltaic assembly and then partially discharging the super-capacitor assembly, said charging occurring in a photovoltaic assembly output voltage range wherein said at least one peak power output value occurs, and wherein the DC/DC converter is selectively turned on by the electronic control circuit when a peak power output value has been reached, and wherein the DC/DC converter is turned off when an output power and an output voltage are decreasing at the same time.

2. The device according to claim 1 wherein said discharging occurs in a photovoltaic assembly output voltage range wherein said at least one peak power output value occurs.

3. The device according to claim 2, wherein said output voltage range is one of a plurality of voltage ranges and the electronic control circuit comprises:
  a means for monitoring, as a function of time, the current and voltage outputs from the photovoltaic assembly; and,
  a means for changing the voltage range in which the capacitor assembly is charged and partially discharged to thereby obtain power from the photovoltaic assembly at or near its peak value.

4. The device according to claim 3, wherein the electronic control circuit determines a maximum power output has occurred and initiates said discharge of the capacitor assembly when the power output subsequently drops to a threshold percentage of said maximum power output.

5. The device according to claim 4, wherein the electronic control circuit stops discharging of the capacitor assembly when the power output subsequently drops to a threshold percentage of said maximum power output.

6. A device according to claim 1, wherein the DC/DC converter is for converting at least some of the capacitor assembly discharge voltages to a desired voltage level.

7. A device according to claim 1, wherein the DC/DC converter is for converting at least some of the capacitor assembly discharge currents to a desired current level.

8. A device according to claim 3, wherein the control circuit contains a programmed electronic control circuit.

9. A device according to claim 3, wherein the electronic circuit contains firmware composed of instructional sets and algorithms.

10. A device according to claim 3, wherein the electronic circuit contains a field programmable gate array.

11. A device according to claim 3, wherein the electronic circuit contains a microcontroller.

12. A device according to claim 3, wherein the electronic circuit contains an application-specific integrated circuit.

13. A device according to claim 1, wherein the DC/DC converter is a switching-mode DC/DC converter.

14. A device according to claim 1, wherein the DC/DC converter is a one-way ON/OFF direct charging switch.

15. A device according to claim 1, wherein the DC/DC converter is a step-up (boost) DC/DC converter.

16. A device according to claim 1, wherein the DC/DC converter, is a step-down (buck) DC/DC converter.

17. A device according to claim 1, wherein the DC/DC converter is a buck-boost DC/DC converter.

18. A device according to claim 1, wherein the device is for charging electrical energy storage device, the DC/DC converter is for increasing the capacitor assembly output discharge voltage to a storage device charging voltage, and the device further comprises a direct discharge path to the energy storage device, and means for
   i) Charging the energy storage device through the DC/DC converter when the capacitor assembly discharge voltage needs to be increased, wherein the DC/DC converter is selectively turned on by the electronic control circuit when a peak power output value has been reached, and wherein the DC/DC converter is turned off when an output power and an output voltage are decreasing at the same time, and
   ii) Charging the energy storage device directly by the direct d) e path when the capacitor assembly discharge voltage is at least the said charge voltage.

* * * * *

UNITED STATES PATENT AND TRADEMARK OFFICE
CERTIFICATE OF CORRECTION

PATENT NO. : 8,264,193 B2
APPLICATION NO. : 11/996157
DATED : September 11, 2012
INVENTOR(S) : Zuohang Zhu and Andrew C. Kular Page 1 of 1

It is certified that error appears in the above-identified patent and that said Letters Patent is hereby corrected as shown below:

Title Page, items 12 and 76, the inventor order is incorrect on the issued patent, being the reverse of the application as filed and through prosecution. The correct order is Zuohang Zhu as first inventor, and Andrew C. Kular as second inventor.

Signed and Sealed this
Eighth Day of January, 2013

David J. Kappos
*Director of the United States Patent and Trademark Office*